US012345939B2

(12) United States Patent
Allen

(10) Patent No.: US 12,345,939 B2
(45) Date of Patent: Jul. 1, 2025

(54) FIBER OPTIC CABLE STORAGE DEVICES, SYSTEMS AND METHODS WITH MOUNTED COMPONENTS AND FIBER LOOP MANAGEMENT

(71) Applicant: COMMSCOPE TECHNOLOGIES LLC, Hickory, NC (US)

(72) Inventor: Barry Wayne Allen, Siler City, NC (US)

(73) Assignee: COMMSCOPE TECHNOLOGIES LLC, Hickory, NC (US)

( * ) Notice: Subject to any disclaimer, the term of this patent is extended or adjusted under 35 U.S.C. 154(b) by 580 days.

(21) Appl. No.: 17/615,335

(22) PCT Filed: May 28, 2020

(86) PCT No.: PCT/US2020/034897
§ 371 (c)(1),
(2) Date: Nov. 30, 2021

(87) PCT Pub. No.: WO2020/243284
PCT Pub. Date: Dec. 3, 2020

(65) Prior Publication Data
US 2022/0221674 A1 Jul. 14, 2022

Related U.S. Application Data

(60) Provisional application No. 62/855,710, filed on May 31, 2019.

(51) Int. Cl.
*G02B 6/44* (2006.01)
(52) U.S. Cl.
CPC .................. *G02B 6/4454* (2013.01)
(58) Field of Classification Search
CPC .................................................. G02B 6/4454
See application file for complete search history.

(56) References Cited

U.S. PATENT DOCUMENTS

| 5,185,845 A | 2/1993 | Jones |
| 5,323,480 A | 6/1994 | Mullaney et al. |

(Continued)

FOREIGN PATENT DOCUMENTS

| EP | 2 383 595 A1 | 11/2011 |
| EP | 2 535 750 A1 | 12/2012 |

(Continued)

OTHER PUBLICATIONS

International Search Report and Written Opinion of the International Searching Authority for International Patent Application No. PCT/US2020/034897 mailed Sep. 14, 2020, 9 pages.

(Continued)

*Primary Examiner* — Andrew Jordan
(74) *Attorney, Agent, or Firm* — Merchant & Gould P.C.

(57) ABSTRACT

A telecommunications assembly where two cable management devices allow for storage of fiber slack loops having a length defined by a cable in a full loop having the radius of the minimum bend radius of the cable up to and including a length twice as long as the full loop having the radius of the minimum bend radius of the cable; wherein no linear segments are defined by the full loop having the radius of the minimum bend radius of the cable; and wherein linear segments are provided in loops greater in length than a full loop having the radius of the minimum bend radius of the cable. The fiber optic cable slack is connected to other fibers or devices on both ends, and the slack is managed in loop shapes without having unmanaged segments that can interfere with other cables, get damaged, or create organization and use problems for the technician.

3 Claims, 17 Drawing Sheets

(56) References Cited

U.S. PATENT DOCUMENTS

| | | |
|---|---|---|
| 5,442,725 A | 8/1995 | Peng |
| 6,275,641 B1 | 8/2001 | Daoud |
| 6,396,989 B1* | 5/2002 | Johnston ............... G02B 6/4452 |
| | | 385/136 |
| 6,424,782 B1 | 7/2002 | Ray |
| 6,456,772 B1 | 9/2002 | Daoud |
| 6,507,691 B1 | 1/2003 | Hunsinger et al. |
| 6,584,267 B1 | 6/2003 | Caveney et al. |
| 6,785,459 B2* | 8/2004 | Schmidt ................. H04Q 1/062 |
| | | 211/26 |
| 11,409,067 B2* | 8/2022 | Van Baelen ......... G02B 6/4471 |
| 2008/0112680 A1 | 5/2008 | McGranahan |
| 2009/0136195 A1 | 5/2009 | Smrha et al. |
| 2011/0044020 A1 | 2/2011 | Hruby et al. |
| 2011/0268415 A1 | 11/2011 | Fabrykowski et al. |
| 2013/0105420 A1 | 5/2013 | Ray et al. |
| 2015/0241654 A1 | 8/2015 | Allen et al. |
| 2016/0103289 A1* | 4/2016 | Campbell ............. G02B 6/4452 |
| | | 385/135 |
| 2016/0161695 A1 | 6/2016 | Chen et al. |
| 2016/0238811 A1 | 8/2016 | Simmons et al. |
| 2017/0146762 A1* | 5/2017 | Campbell ............. G02B 6/4453 |
| 2017/0343757 A1 | 11/2017 | Giraud et al. |
| 2018/0081139 A1* | 3/2018 | Geens .................. G02B 6/4477 |
| 2018/0372978 A1* | 12/2018 | Wentworth .......... G02B 6/4455 |
| 2020/0257072 A1* | 8/2020 | Wentworth ............ G02B 6/447 |
| 2021/0181449 A1* | 6/2021 | Van Baelen ............. H04Q 1/06 |
| 2022/0221674 A1* | 7/2022 | Allen .................... G02B 6/4454 |
| 2022/0291470 A1 | 9/2022 | Claessens et al. |

FOREIGN PATENT DOCUMENTS

| | | |
|---|---|---|
| WO | 03/004912 A1 | 1/2003 |
| WO | 2019/160995 A1 | 8/2019 |
| WO | 2019/209643 A1 | 10/2019 |
| WO | 2020/198155 A1 | 10/2020 |

OTHER PUBLICATIONS

Extended European Search Report for Application No. 20812549.2 mailed May 25, 2023.

Fiber Optic Splice Closure, FOSC-450-BS Installation Instruction, CommScope, TC-642-IP, Rev A, 16 pages (Feb. 2017).

Fiber Optic Splice Closure, FOSC 600 C and D Installation Instruction, CommScope, 16 pages (Apr. 2008).

Fiber Optic Splice Closure Trays: A and B Size, Installation Instruction For FOSC 400 or 450 A and B, AIR FOSC and FTerm AF Splice Closures, CommScope, 6 pages (May 2007).

Fibre Optic Splice Closure with integrated organiser system, FOSC-400A4 Installation Instruction, CommScope, TC-441-IP, Rev B, CommScope, 20 pages (Dec. 2018).

Pages from HellermannTyton, 6 pages (2015).

Splice Trays and Storage Baskets for FOSC-400 and FOSC-450 Splice Closures, Ordering Guide, CommScope, 8 pages (Dec. 2015).

* cited by examiner

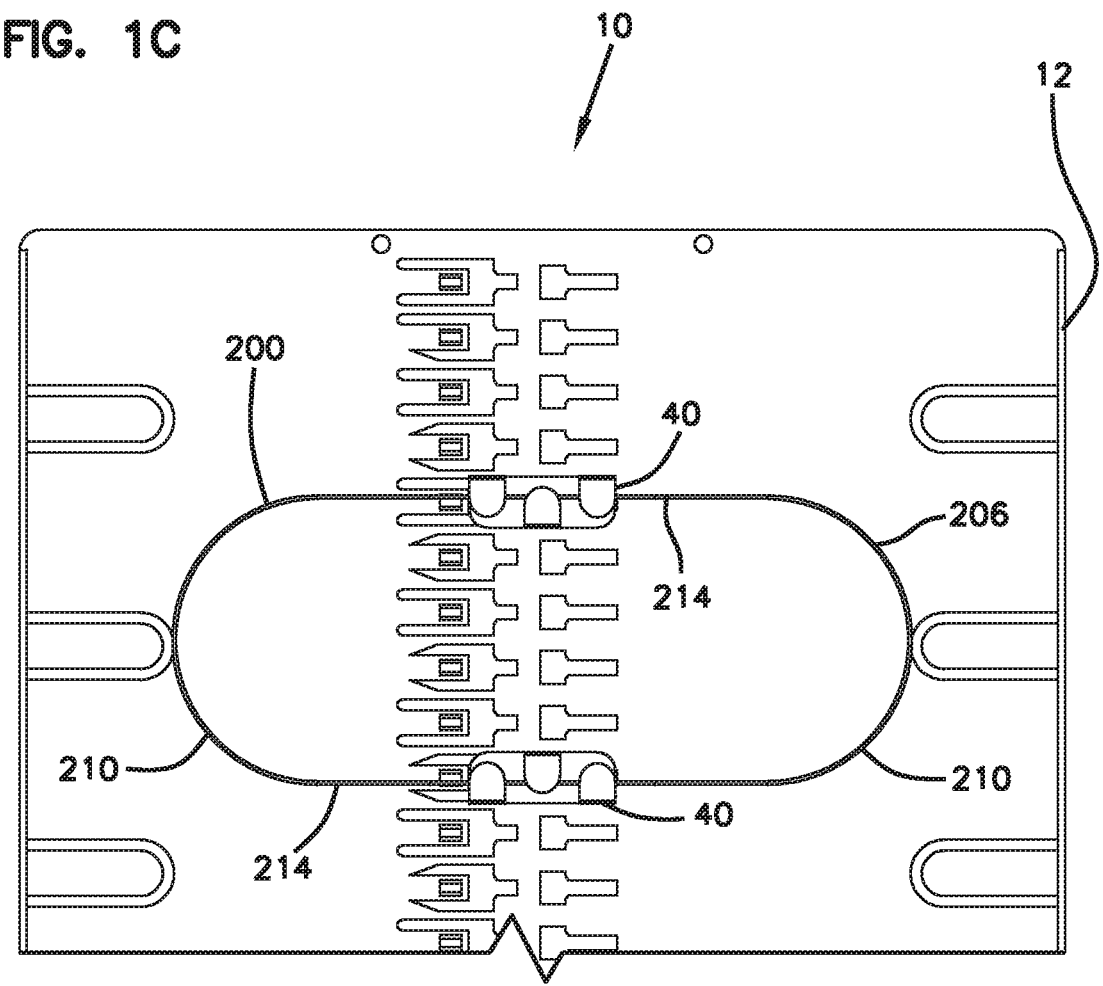

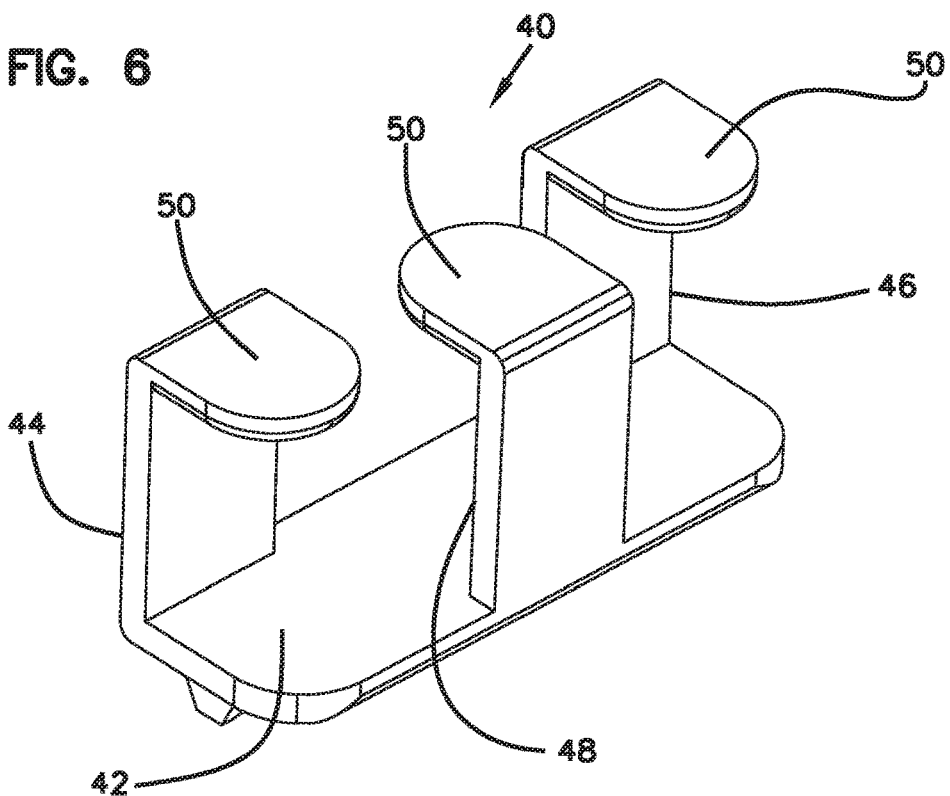
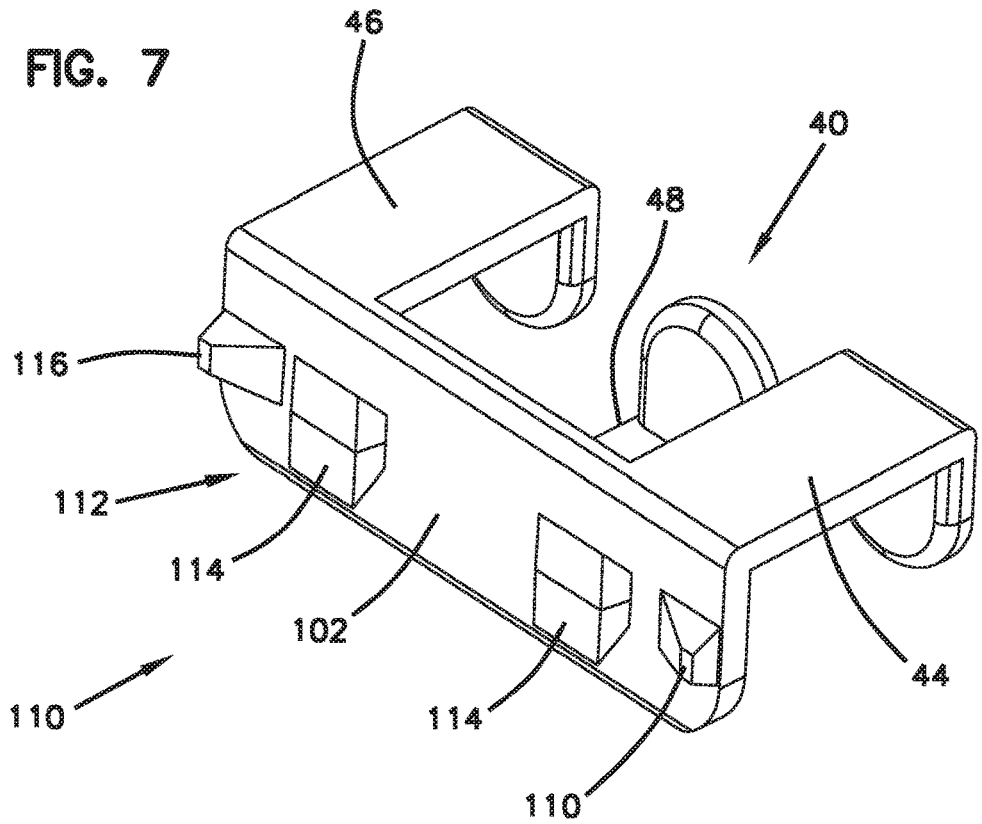

FIBER OPTIC CABLE STORAGE DEVICES, SYSTEMS AND METHODS WITH MOUNTED COMPONENTS AND FIBER LOOP MANAGEMENT

CROSS-REFERENCE TO RELATED APPLICATION

This application is a National Stage Application of PCT/US2020/034897, filed on May 28, 2020, which claims the benefit of U.S. Patent Application Ser. No. 62/855,710, filed on May 31, 2019, the disclosures of which incorporated herein by reference in their entireties. To the extent appropriate, a claim of priority is made to each of the above disclosed applications.

TECHNICAL FIELD

The present disclosure relates generally to fiber optic telecommunications equipment and components. More particularly, the present disclosure relates to devices, systems and methods for storing fiber optic cables, such as loops of fiber optic cable slack.

BACKGROUND

Telecommunications systems, for example fiber optic closures and other devices, can involve the storage of fiber optic cable components such as splices, splitters, or other devices, and the accompanying fiber optic cable connecting to those components. Slack management is important, especially with respect to splicing. The slack fiber optic cable is needed for accessing the fusion splicing equipment to connect the two fibers. Excessive slack is not a preferred situation in that such slack takes up more space and/or needs to be organized and managed.

In the case of a repair of fiber optic connections, such as a re-splice, additional issues arise with respect to managing the slack. If a repair technician is required to re-route fiber optic cables inside or outside of the closure to locate additional slack to make the repair, such events can be time consuming or costly.

Additionally, the overall size of outside plant closures in general, and repair closures in particular, may be limited. For example, there may be size limits so the closures do not hinder placement in the field. Therefore, if the internal slack storage is limited in space it may limit the technician's ability to properly manage short lengths of spliced fiber required in these smaller closures.

Improvements are desired.

SUMMARY

This disclosure pertains to routing of fiber optic cables in an organized manner within a fiber optic tray or other device where fiber optic cable slack needs to be stored.

This disclosure further pertains to management of fiber optic cable slack in a manner where the fibers are managed in loop shapes without going below the minimum bend radius of the respective cable.

This disclosure further pertains to management of fiber optic cable slack in a manner where the fibers are connected to other fibers or devices on both ends, and the slack is managed in loop shapes without having unmanaged segments that can interfere with other cables, get damaged, or create organization and/or use problems for the technician.

This disclosure pertains to devices, systems and methods for management of fiber optic cable slack in a manner where the fibers are managed in loop shapes without going below the minimum bend radius of the respective cable, and where the minimum bend radius for the specific cable to be stored can be accounted for during assembly of the cable storage device.

This disclosure relates to managing fiber optic cables wherein the slack lengths to be managed may vary between the different fiber optic cables being managed by the fiber optic tray or other device.

This disclosure pertains to fiber optic cable storage devices, systems and methods used to store cable slack. The devices, systems and methods include a substrate, such as a tray in a telecommunication closures of the type found in the outside plant. Cable management devices are provided on the substrate for containing one or more fiber loops.

In one embodiment, two cable management devices are provided on the substrate facing one another.

In another embodiment, the two cable management devices allow for storage of fiber loops having a length defined by a cable in a full loop having the radius of the minimum bend radius of the cable.

In another embodiment, the two cable management devices allow for storage of fiber loops having a length defined by a cable in a full loop having the radius of the minimum bend radius of the cable up to and including a length twice as long as the full loop having the radius of the minimum bend radius of the cable.

In another embodiment, the two cable management devices allow for storage of fiber loops having a length defined by a cable in a full loop having the radius of the minimum bend radius of the cable up to and including a length twice as long as the full loop having the radius of the minimum bend radius of the cable; wherein no linear segments are defined by the full loop having the radius of the minimum bend radius of the cable; and wherein linear segments are provided in loops greater in length than a full loop having the radius of the minimum bend radius of the cable.

In another embodiment, the cable management devices are provided on the substrate for containing one or more fiber loops, and are mounted to the substrate at a desired spacing to take into account the minimum bend radius of the stored cable.

In one embodiment, the cable management devices are provided with a base, and three uprights. Two uprights are on one side of the base, and one upright is on an opposite side of the base. When the cable management devices are mounted on the substrate for containing one or more fiber loops, they are mounted facing one another with the sides of the base with the one upright facing each other. Overhanging tabs on the ends of the uprights can be provided to assist with fiber retainment.

In another embodiment, the cable management devices are removably mounted to the substrate at a desired spacing to take into account the minimum bend radius of the cable.

This disclosure pertains to fiber optic cable storage devices, systems and methods used to store cable slack. The devices, systems and methods include a substrate, such as a tray in a telecommunication closures of the type found in the outside plant. Cable management devices are provided on the substrate for containing one or more fiber loops. Only two cable management devices are provided on the substrate facing one another. No outside fiber retainment devices are provided in a transverse direction relative to the two cable management devices. The two cable management devices allow for storage of fiber loops having a length defined by a cable in a full loop having the radius of the minimum bend radius of the cable up to and including a length twice as long as the full loop having the radius of the minimum bend radius of the cable. The two cable management devices allow for storage of fiber loops wherein no linear segments are defined by the full loop having the radius of the minimum bend radius of the cable; and wherein linear segments are provided in loops greater in length than a full loop having the radius of the minimum bend radius of the cable. The cable management devices are provided with a base, and three uprights. Two uprights are on one side of the base, and one upright is on an opposite side of the base. When the cable management devices are mounted on the substrate for containing one or more fiber loops, they are mounted facing one another with the sides of the base with the one upright facing each other. Overhanging tabs on the ends of the uprights can be provided to assist with fiber retainment.

Some telecommunications equipment uses tray systems to manage fiber optic cables and components. Some trays utilize fusion splice holder modules to organize and protect spliced optical fibers stored on the trays. These modules have also been integrated with optical components such as WDM and splitters. In one example, the CommScope FOSC line of splice trays are configured to receive and retain a splice holder module.

The trays, management devices, and component modules are provided with compatible attachment features that allow for the management devices and modules to be mounted to the trays. These trays can also include both the cable management devices for managing the fiber loops and the component modules, or those trays can be separate from the component modules on other trays.

A variety of additional aspects will be set forth in the description that follows. The aspects can relate to individual features and to combinations of features. It is to be understood that both the foregoing general description and the following detailed description are exemplary and explanatory only and are not restrictive of the broad inventive concepts upon which the examples disclosed herein are based.

BRIEF DESCRIPTION OF THE DRAWINGS

The accompanying drawings, which are incorporated in and constitute a part of the description, illustrate several aspects of the present disclosure. A brief description of the drawings is as follows:

FIG. 1C shows the device of FIG. 1, with a third, still larger loop of fiber optic cable having a similar set of radiused ends approximately equal to or greater than the minimum bend radius of the fiber optic cable of FIG. 1B, and including longer linear segments interconnecting the radiused ends, wherein this loop is approximately double the circumference of the fiber loop in FIG. 1A;

FIG. 6 is a top perspective view of the cable management device of FIG. 2;

FIG. 7 is a bottom perspective view of the cable management device of FIG. 2;

DETAILED DESCRIPTION

Figure 1:
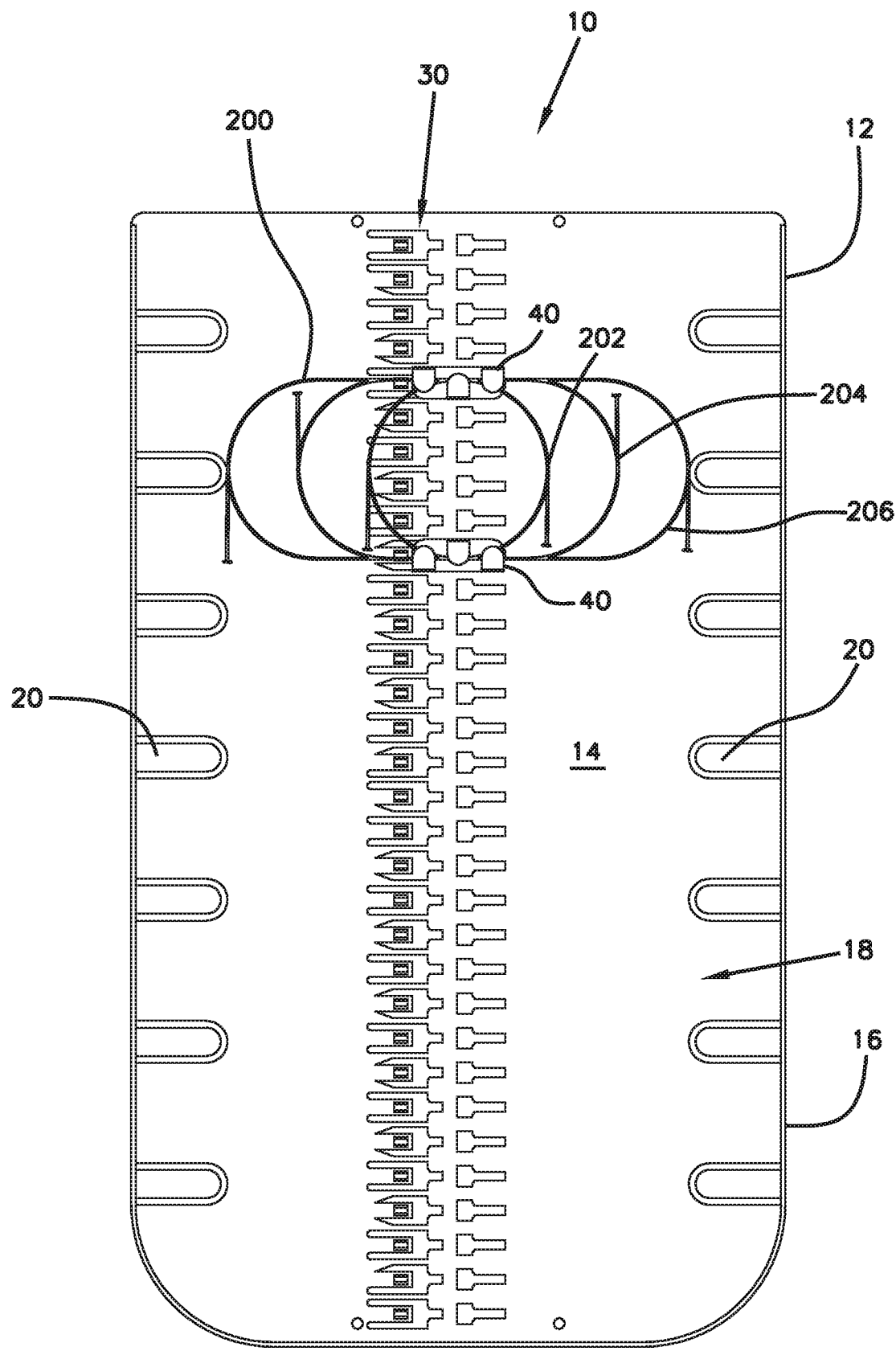
FIG. 1 is a top schematic view showing an example embodiment of a cable storage device for managing different loops of fiber optic cable.

Referring to FIGS. 1 to 8, a telecommunications cable storage device 10 is shown. In one aspect, the telecommunications cable storage device 10 includes a tray 12 for storing fiber optic cables, and optionally telecommunications components. As shown, the tray 12 includes a base 14 and a circumferential sidewall 16 to define an interior volume 18. To help retain fiber optic cables within the tray, extension tabs or members 20 can be provided. In the example shown, a plurality of extension tabs 20 are provided extending from the sidewall 16 over the interior volume 18 and in a direction parallel to the base 14.

The tray 12 is also shown as including a plurality of attachment arrangements 30 arranged in an array extending the length of the tray 12 along the base 14. The attachment arrangements 30 are configured to receive and retain cable management devices 40. Various telecommunications components can also be provided, such as fiber optic adapters, splice holders, optical splitters, wavelength division multiplexers (WDM), and the like that are provided with an attachment arrangement compatible with the attachment arrangements 30.

Cable management devices 40 in the illustrated embodiment are paired to store cable loops on a substrate, like the base 14 of the tray 12.

Fiber optic slack management systems are needed in a variety of applications. One application is management of fiber optic slack required to splice two optical fibers together, and then stored and organized on trays. The tray systems contain routing paths to manage coils or loops of slack fiber and contain restrictive features to help the slack fiber maintain minimal bend radiuses (or above) to avoid fiber damage. Too many restrictions on an organizer system can create limitations on what lengths of slack can be stored. This can occur when a coil or loop of fiber is too large to fit the outer perimeter of the organizer, yet too small to make two complete loops around the inner perimeter.

The cable storage device 10 helps avoid needing specifically cut lengths so as to avoid unmanaged lengths of fiber that do not fit into any management device provided. These are sometimes referred to as "black out lengths" that result in not being able to properly store fibers in an organizer.

The devices, systems and methods by design and location on tray 12 provide fiber management and eliminate "black out lengths". The cable management devices 40 are provided in pairs and face each other. The cable management devices include a quick connect features that allows them to snap into desired locations by a dove tail locking system that will be described below. Preferably the cable management devices 40 are identical.

The cable storage device 10 includes the ability to accommodate any length of fiber greater than one coil or loop. The cable storage device 10 is constructed in a modular manner to enable the minimum bend radius to be modified depending on the fiber optical cable being used and its associated minimum bend radius.

FIG. 1 shows an example embodiment of a cable storage device for managing different sized loops 202, 204, 206 of fiber optic cable 200. The loops 202, 204, 206 are representative of single loops or a plurality of loops. The cables of each loop are connected to splices or other components on tray 12 or elsewhere. The cable 200 is stored as part of a connectivity solution where the loops of slack need storage.

Figure 1A:
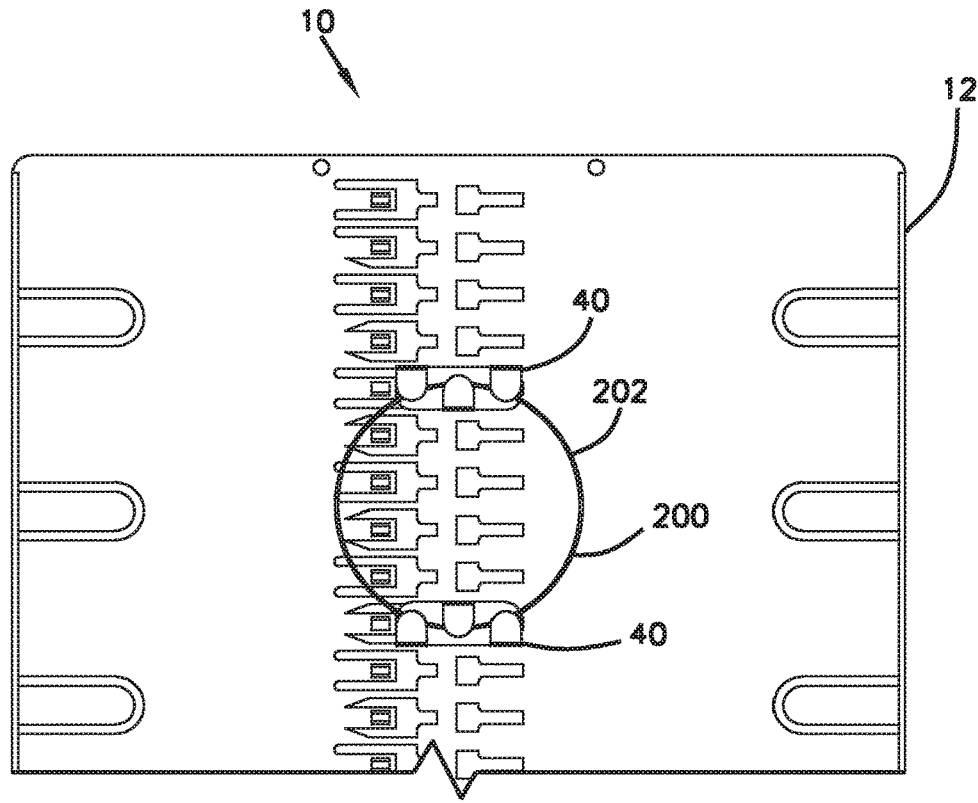
FIG. 1A shows the device of FIG. 1 for managing a first loop of fiber optic cable generally having a radius approximately equal to or greater than the minimum bend radius of the fiber optic cable.

FIG. 1A shows the device 10 of FIG. 1 for managing a first loop 202 of fiber optic cable 200 generally having a radius approximately equal to or greater than the minimum bend radius of the fiber optic cable.

Figure 1B:
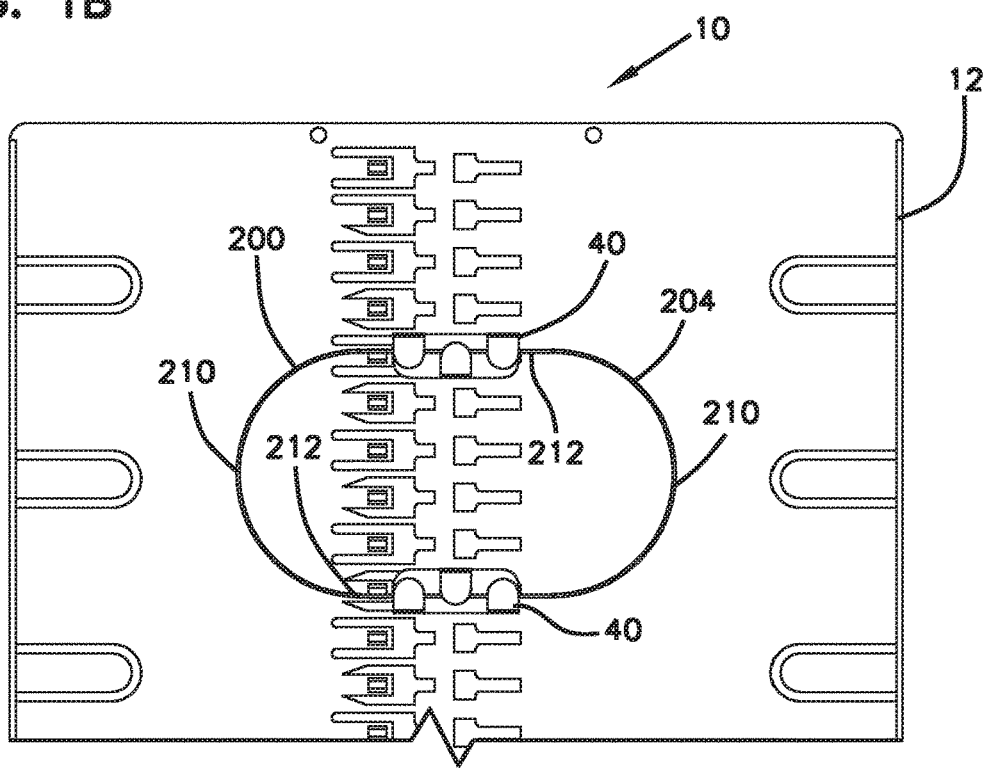
FIG. 1B shows the device of FIG. 1, with a second, larger loop of fiber optic cable generally including radiused ends approximately equal to or greater than the minimum bend radius of the fiber optic cable, interconnected by linear segments, but less than two times the length (double the circumference) of the fiber loop in FIG. 1A.
Figure 2:
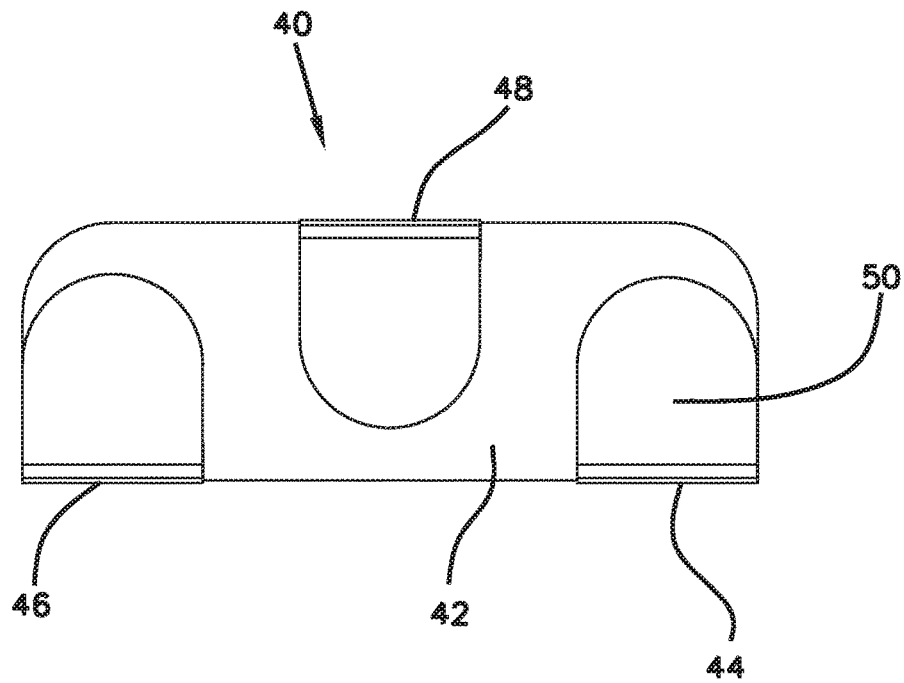
FIG. 2 is a top view of one of the cable management devices of the cable storage device of FIG. 1.
Figure 3:
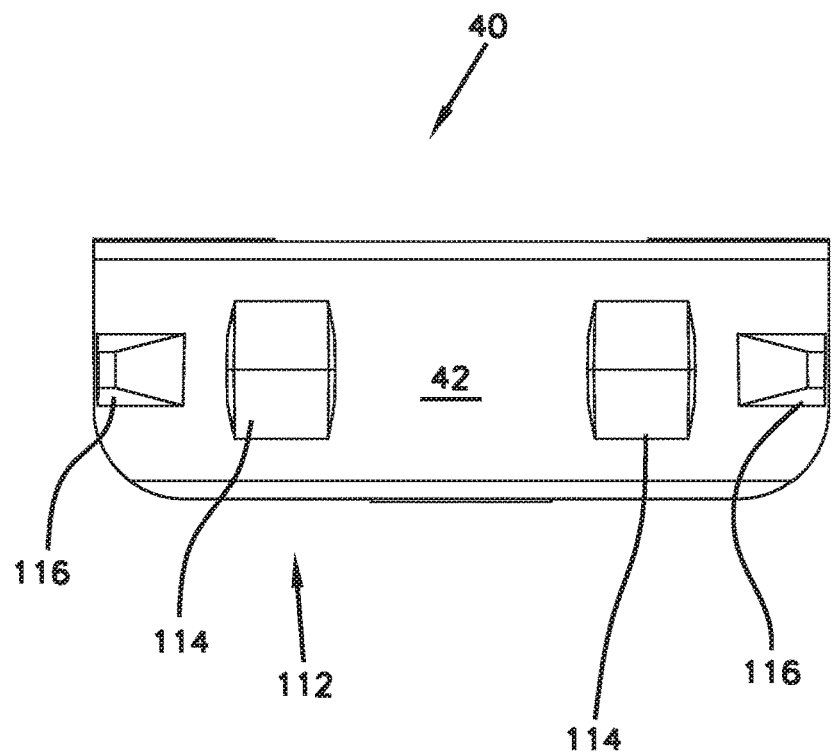
FIG. 3 is a bottom view of the cable management device of FIG. 2.
Figure 4:
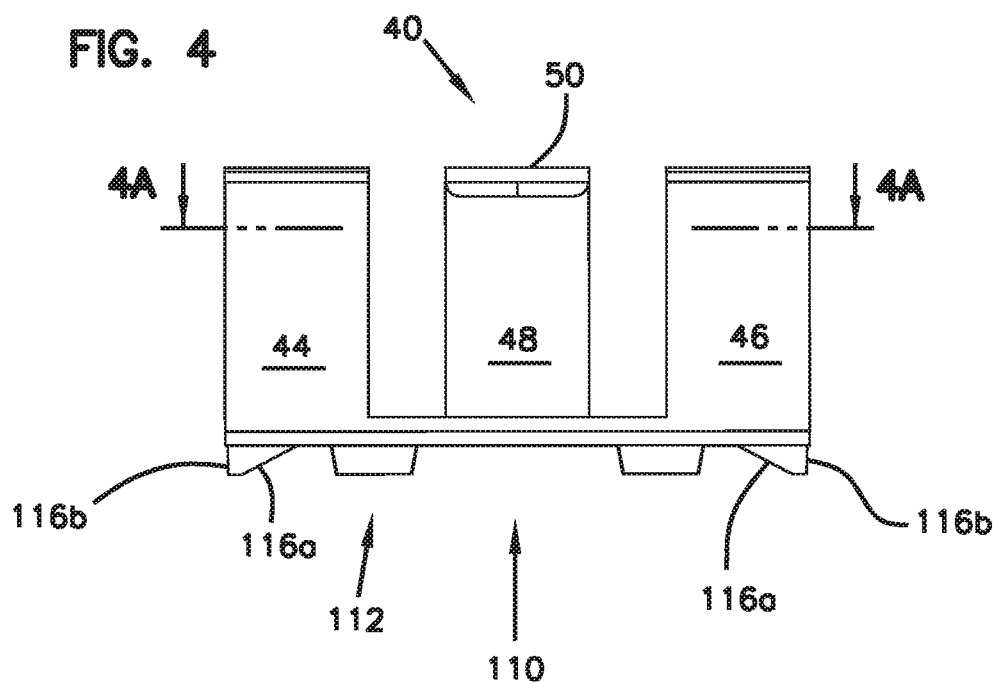
FIG. 4 is a side view of the cable management device of FIG. 2.
Figure 4A:
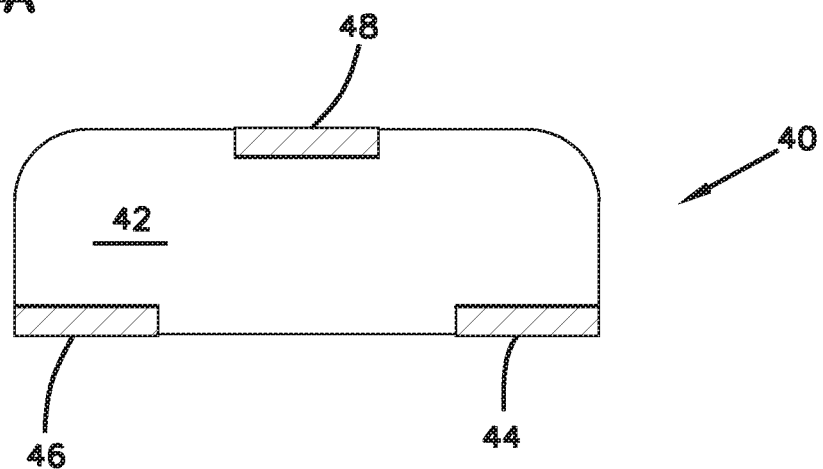
FIG. 4A is a cross-sectional top view of the cable management device of FIG. 2, along lines 4A-4A of FIG. 4.
Figure 5:
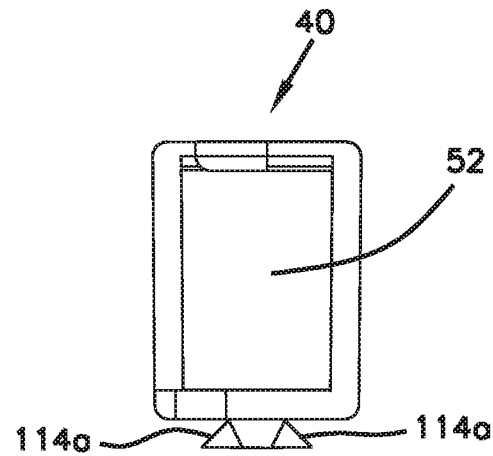
FIG. 5 is an end view of the cable management device of FIG. 2.

FIG. 1B shows the device 10 of FIG. 1, with a second, larger loop 204 of fiber optic cable generally including radiused ends 210 approximately equal to or greater than the minimum bend radius of the fiber optic cable, interconnected by linear segments 212.

FIG. 1C shows the device 10 of FIG. 1, with a third, still larger loop 206 of fiber optic cable having a similar set of radiused ends 210 approximately equal to or greater than the minimum bend radius of the fiber optic cable of FIG. 1B, and including longer linear segments 214 interconnecting the radiused ends 210. Loop 206 is approximately double the circumference of loop 202 in FIG. 1A.

Figure 10:
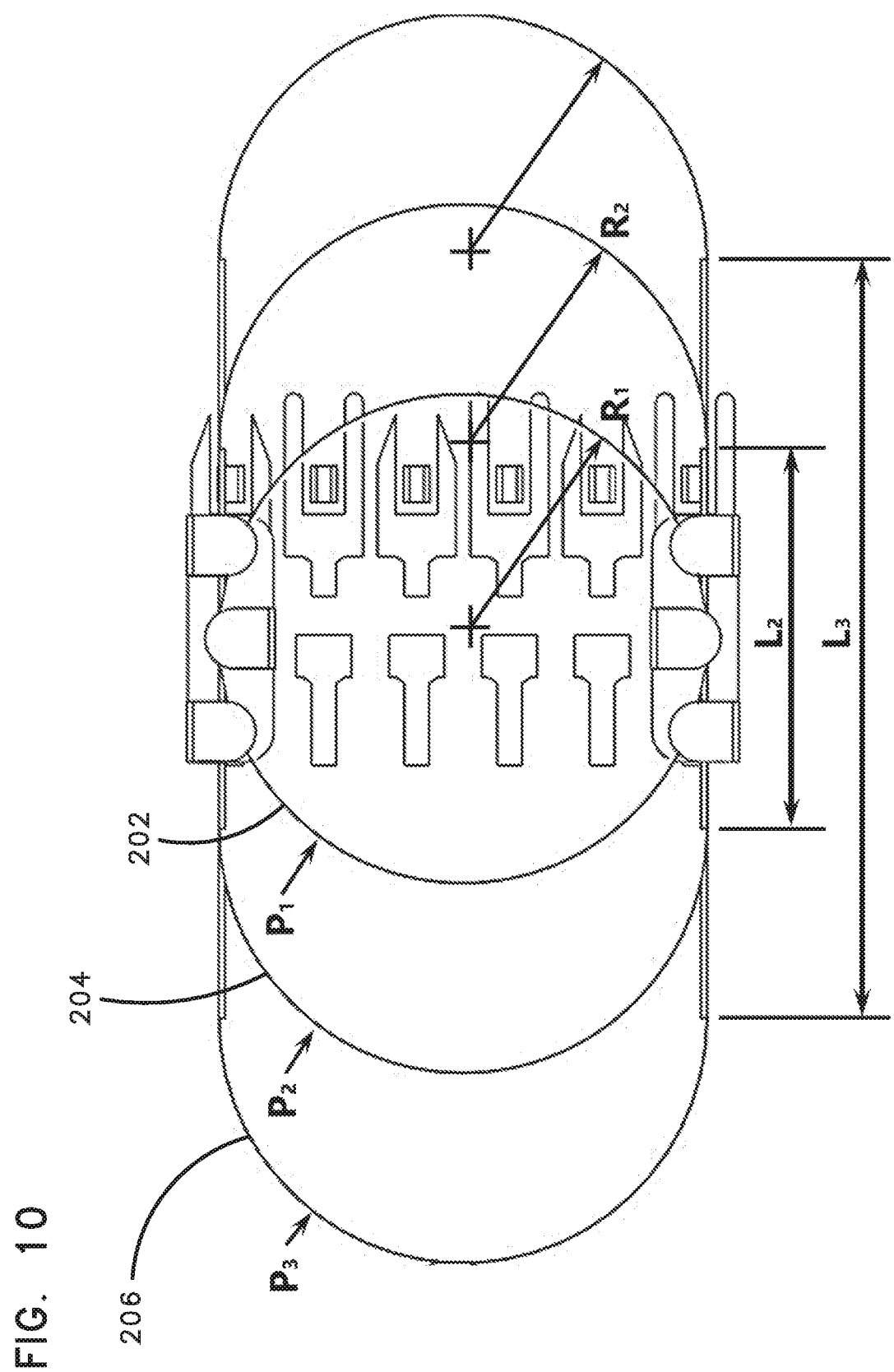
FIG. 10 illustrates the same cable loops of FIGS. 1, 1A, 1B, 1C, illustrating various radial dimensions and linear segment dimensions.

Fiber overlength or slack is stored within the cable storage device 10 with cable management devices 40 according to the following, with reference to FIG. 10:

Pn=Perimeter of Path n
Ln=Tangent Length of Path n
Rn=Minimum Bend Radius of Path n
P3=2*P1 (continuous range of slack storage from P1 to P3)
P1=2*Pi*R1
P3=2*(2*Pi*R1)=2*L3+(2*Pi*R3)
R3=R1
L3=P1*R1.
If: L3=Pi*R1;
Then: Pn can be any length>P1.
If: Pn is between P1 and two times P3;
Then: maximum of two coils are required.
If: Pn is between P1 and three times P3;
Then: Maximum of three coils are required.
This trend continues for four times P3, etc.
Rn=10 mm, 15 mm, 20 mm, 30 mm, are some examples of minimum cable radius dimensions in the market.
P2 and L2 represent a cable loop 204 of a length between the minimum loop 202 and the maximum loop 206.

Given Rn is application dependent based on fiber type, such as 10 mm, 15 mm, 20 mm, 30 mm, tray 12 can be assembled and/or adjusted to efficiently accommodate any slack length.

In one embodiment as shown in FIGS. 2-7, the cable management devices 40 are provided with a base 42, and three uprights 44, 46, 48. Two uprights 44, 46 are on one side of the base 42, and one upright 48 is on an opposite side of the base 42. When the cable management devices 40 are mounted on the substrate for containing one or more fiber loops, they are mounted facing one another with the sides of the base with the one upright 48 facing each other. Overhanging tabs 50 on the ends of the uprights can be provided to assist with cable retainment. An inner trough area 52 is constructed to retain one or more fibers passing through the passage. The symmetrical design of each cable management device 40 eliminates left/right components.

The three pronged cable management device 40 provides a device, system and method capable of at least one of the following:

1. A fiber coil storage device that can adapt to various minimum bend diameters.
2. A fiber storage system to capture a full coil of fiber that is created by affixing two opposed three pronged cable managers to a substrate (for example, a tray).
   a. The two inboard vertical uprights of this configuration provide a full minimum diameter circular path with no flat edges at the extreme diametrically opposed tangencies. The tab created at the top of these inboard uprights prevents fibers from falling off in the minimum configuration.
   b. The four outboard vertical uprights provide outward expansion containment as the required cable length to be stored grows (thus forming an oval) when a given length of fiber to be stored is greater than the circumference generated by the minimum diameter yet not yet a multiple of that same circumference. The tab created at the top of these outboard uprights prevents fibers from pushing off from outward expansion.
   c. The device is constructed such that the minimum coil diameter can be adjusted and determined by the distance between the inboard uprights.
3. Although the inboard vertical as shown has a small flat surface the effect is negligible given the ratio of trough width (distance between the double and single tabs on a single clip) and foreseeable minimum coil diameters to be stored. Furthermore the flat surface could be completely eliminated if the upright was a semicircular round or otherwise curved post and the coils touched only at the tangencies.

a. A device with anything more than one inboard post that forms the channel is not likely to achieve this optimal storage without significantly growing the trough width and thus quickly makes the device too large for many applications.

Figure 8:
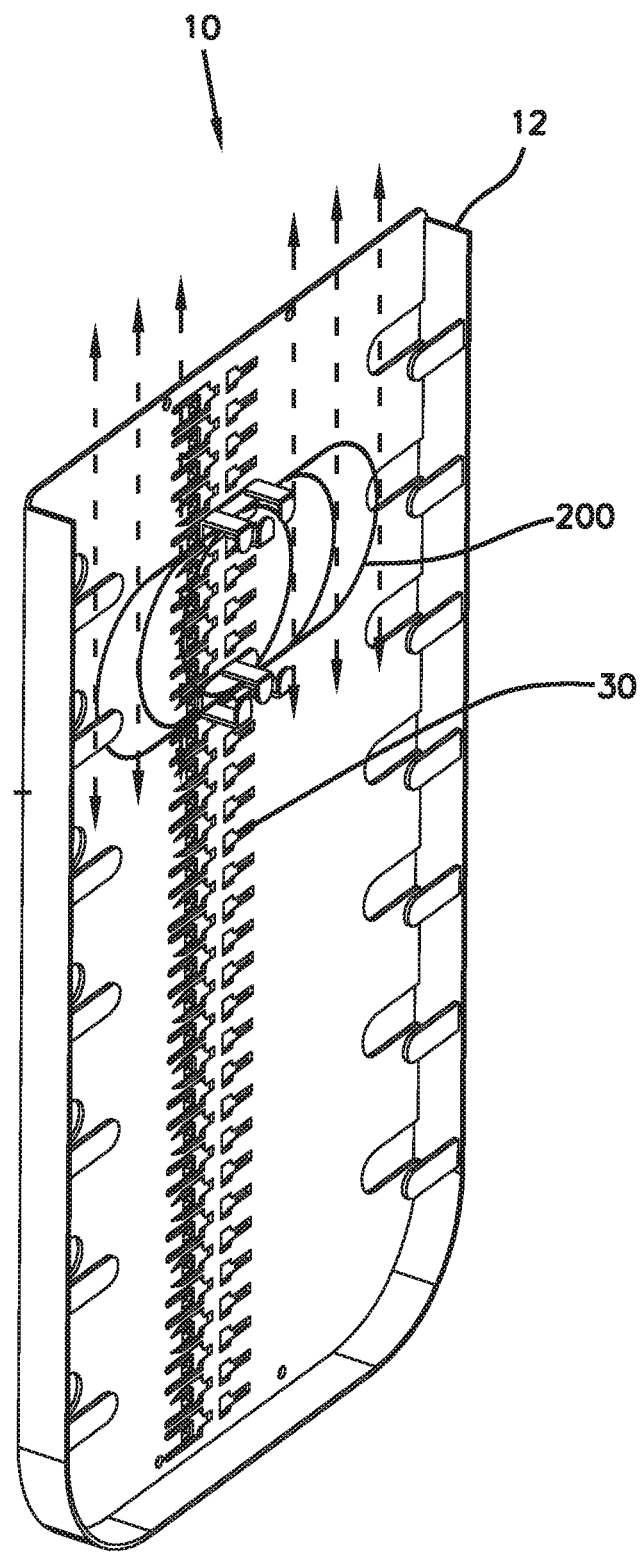
FIG. 8 is a perspective view of cable storage device FIG. 1.

Cable management devices 40 and a substrate 12 allow for convenient management of fiber optic cable slack in a manner where the fibers are connected to other fibers or devices on both ends, and the slack is managed in loop shapes without having unmanaged segments that can interfere with other cables, get damaged, or create organization and use problems for the technician. FIG. 8 shows the example cable loops 200 with the various tangent directions the cables leave the loops to extend to a splice or other component. FIG. 1 also shows exemplary tangent directions for the cable 200 leaving the loops.

Cable management devices 40 and a substrate 12 help facilitate compact storage. In the case of outside plant closures, and in particular repair closures, overall size is desired to be as compact as possible such that they do not hinder placement. Therefore, for reduced internal slack storage space a technician needs to properly manage the short lengths of spliced fiber required in these small closures, such as with the illustrated cable management devices 40 and cable loops they manage.

Figure 9:
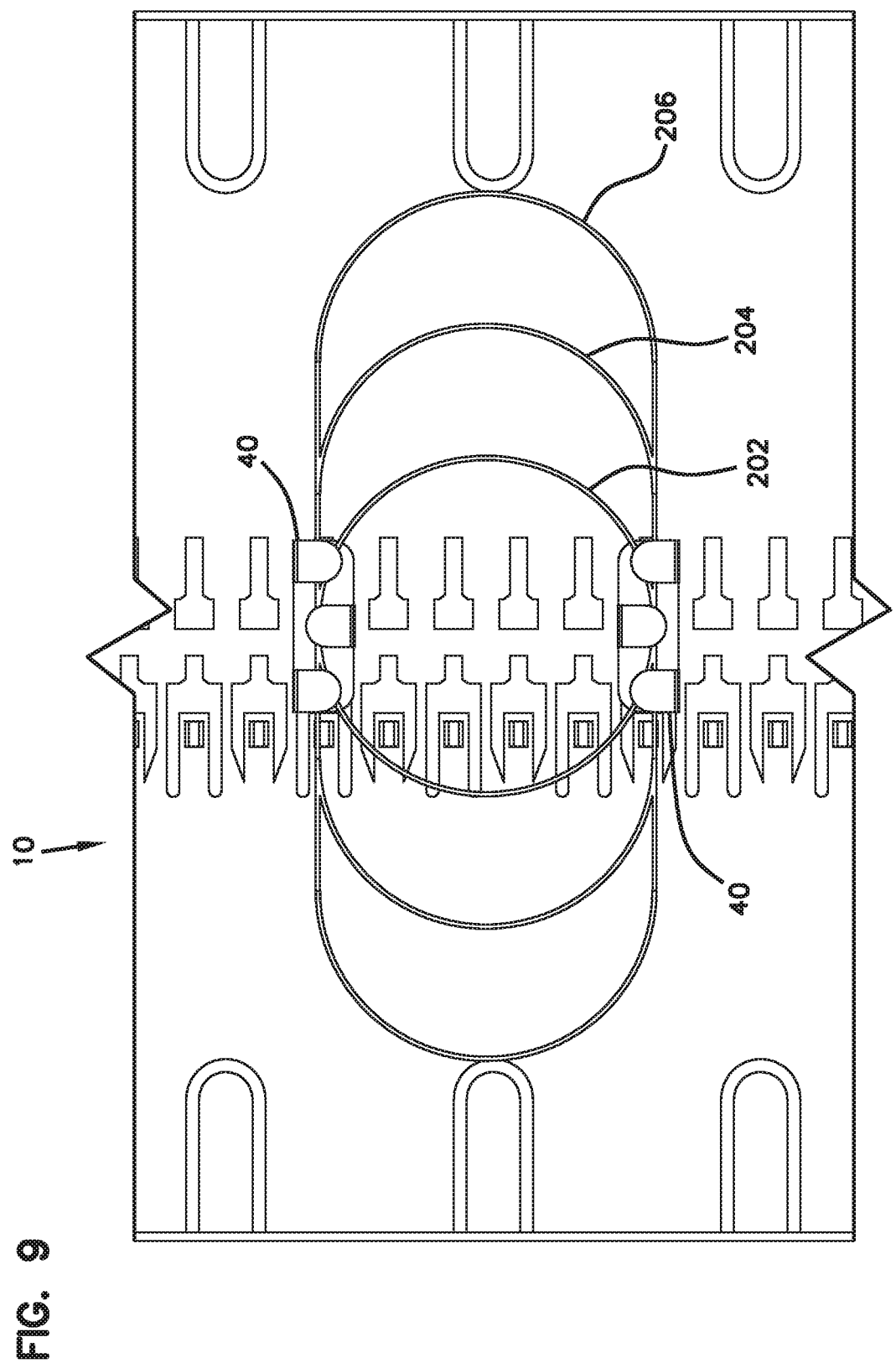
FIG. 9 is an enlarged view of the cable storage device shown in FIG. 1 showing the various representative loops of fiber optic cable.
Figure 9A:
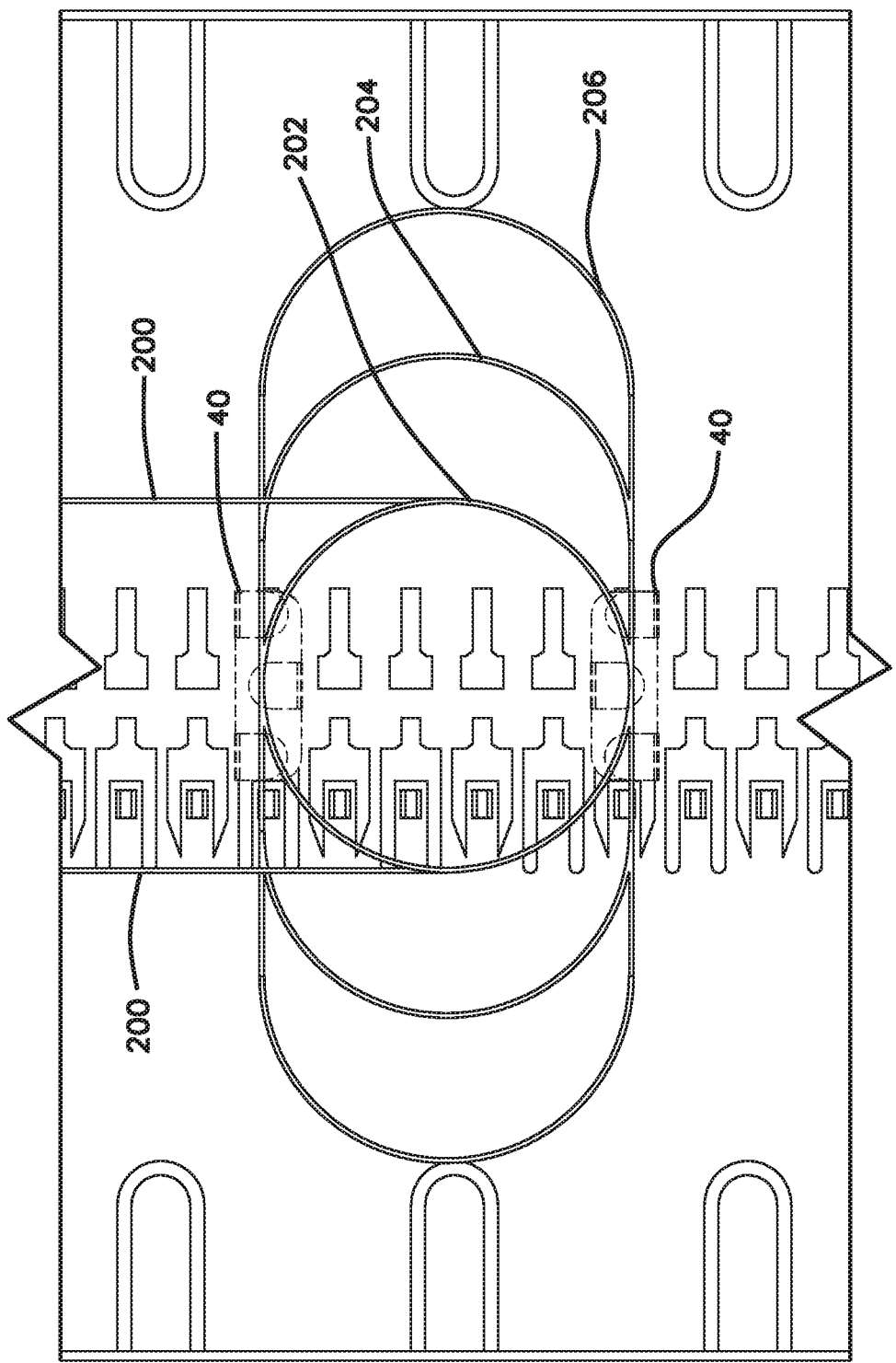
FIG. 9A shows fiber optic cables exiting and entering the cable storage device of FIG. 9 for the smallest cable loop.
Figure 9B:
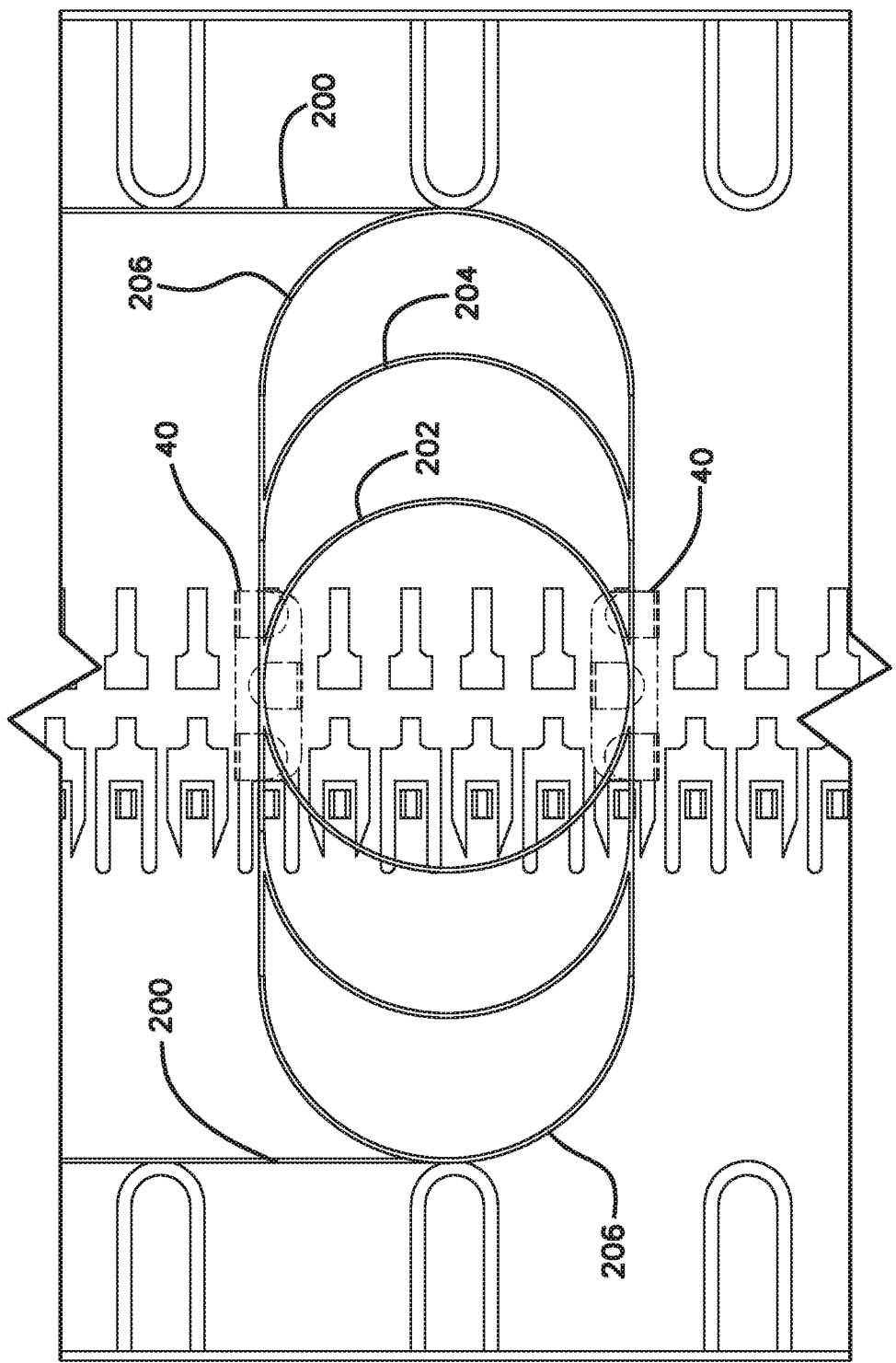
FIG. 9B shows fiber optic cables entering and exiting the cable storage device of FIG. 9 for the largest cable loop.
Figure 9C:
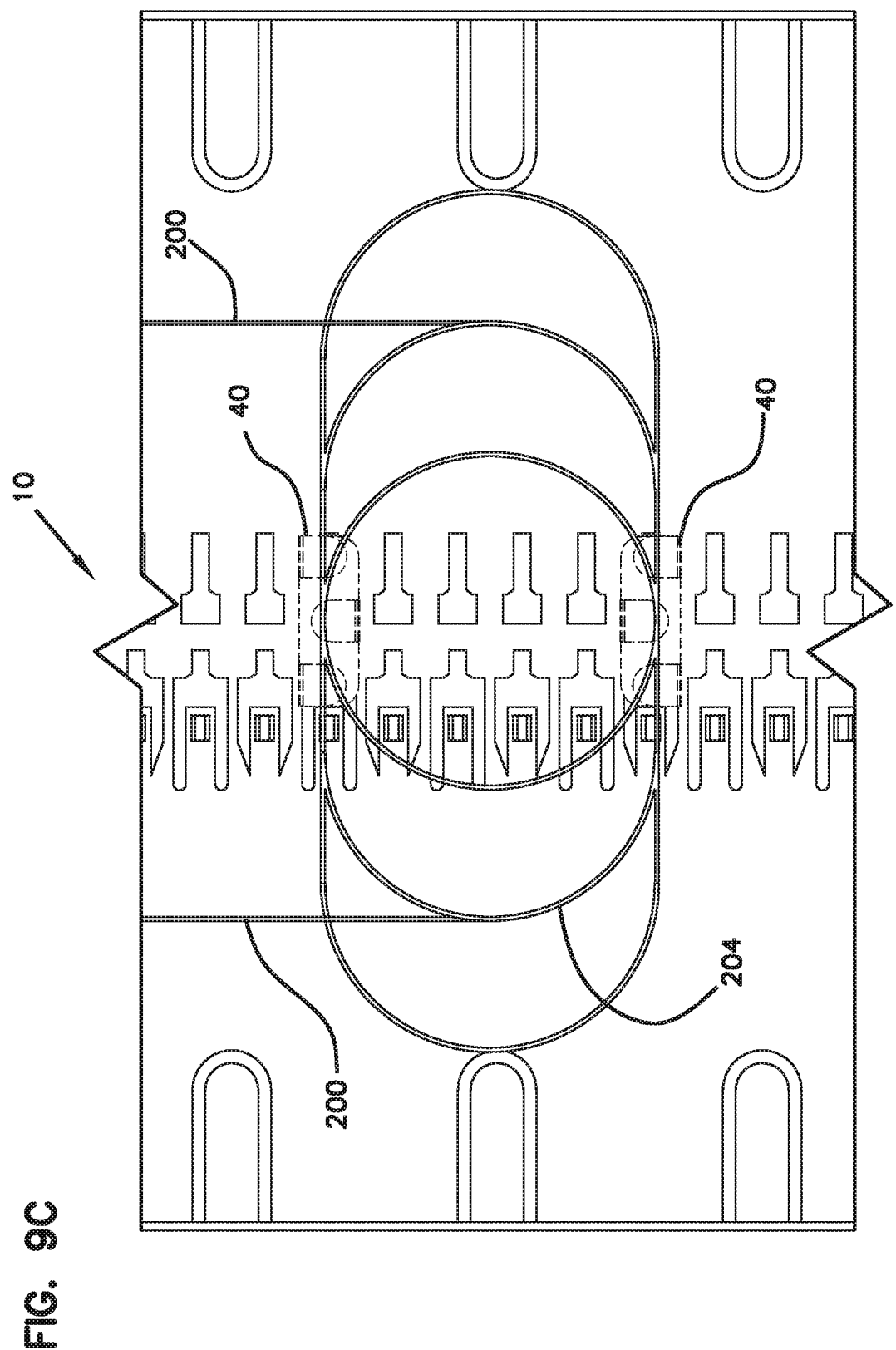
FIG. 9C shows fiber optic cables entering and exiting the cable storage device of FIG. 9 for the intermediate cable loop.

FIG. 9 is an enlarged view of the cable storage device 10 shown in FIG. 1 showing the various representative loops of fiber optic cable. FIG. 9A shows fiber optic cables 200 exiting and entering the cable storage device 10 of FIG. 9 for the smallest cable loop 202. FIG. 9B shows fiber optic cables 200 entering and exiting the cable storage device 10 of FIG. 9 for the largest cable loop 206. FIG. 9C shows fiber optic cables 200 entering and exiting the cable storage device 10 of FIG. 9 for the intermediate cable loop 204.

Typically fibers come off the loops at the most distant points from the center as found in FIG. 9B. These tangents are also illustrative of the minimum desired width of a walled tray. FIGS. 9A and 9C are to be noted as being possible, but are not likely typical.

Figure 9D:
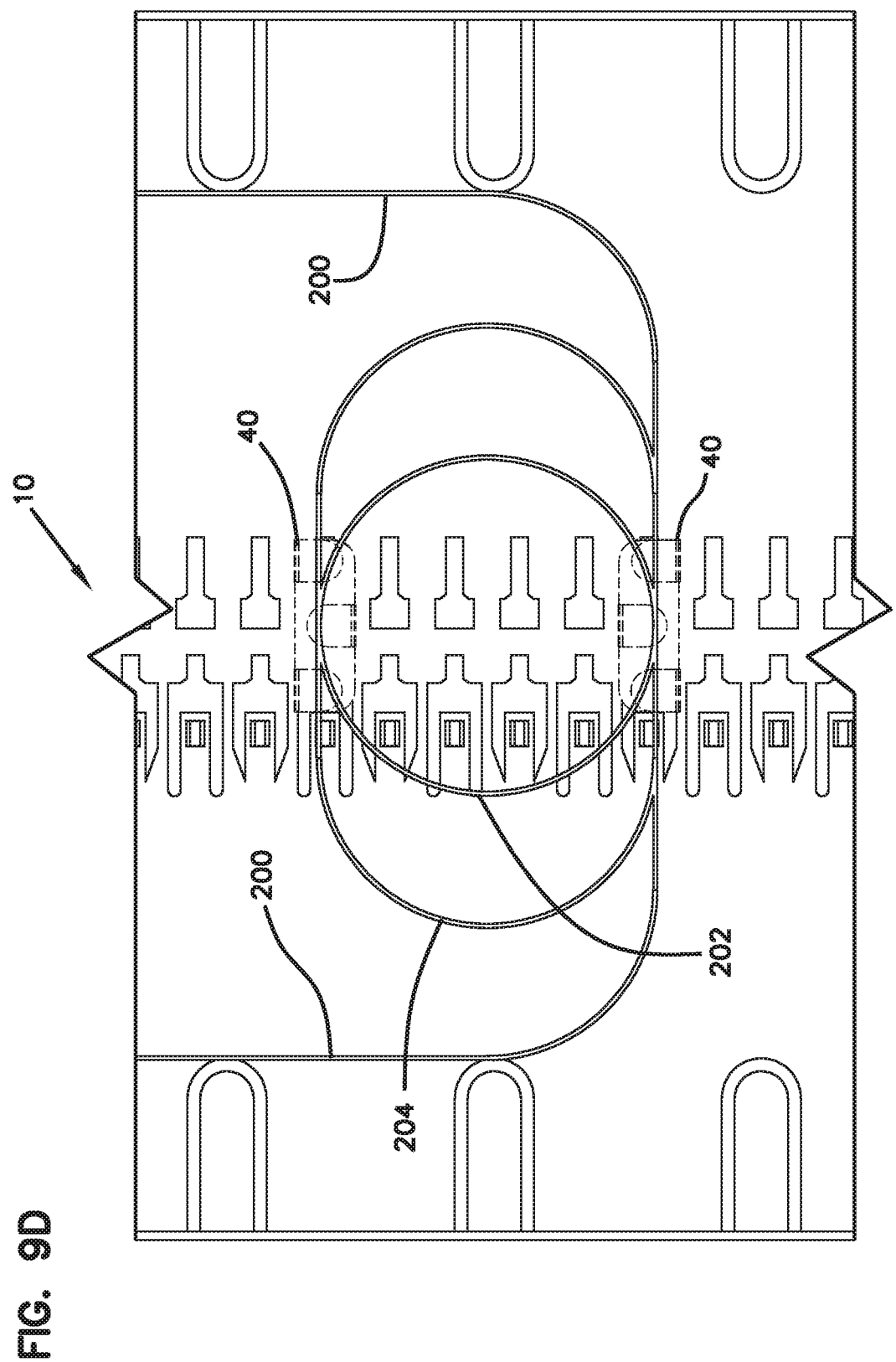
FIG. 9D shows two full and one half partial loop of fiber optic cables stored.

FIG. 9D shows two full and one half partial loop of fiber optic cables 200 stored. In this application the half loop has been assumed as a method of entry and exit of the fiber into the storage coil and has been assumed to be fixed regardless of additional slack requirements. For optimal storage the width of this area must be at least this dimension to allow for any length of fiber greater than one and a half circumferences of the minimum sized loop to be placed.

Figure 11:
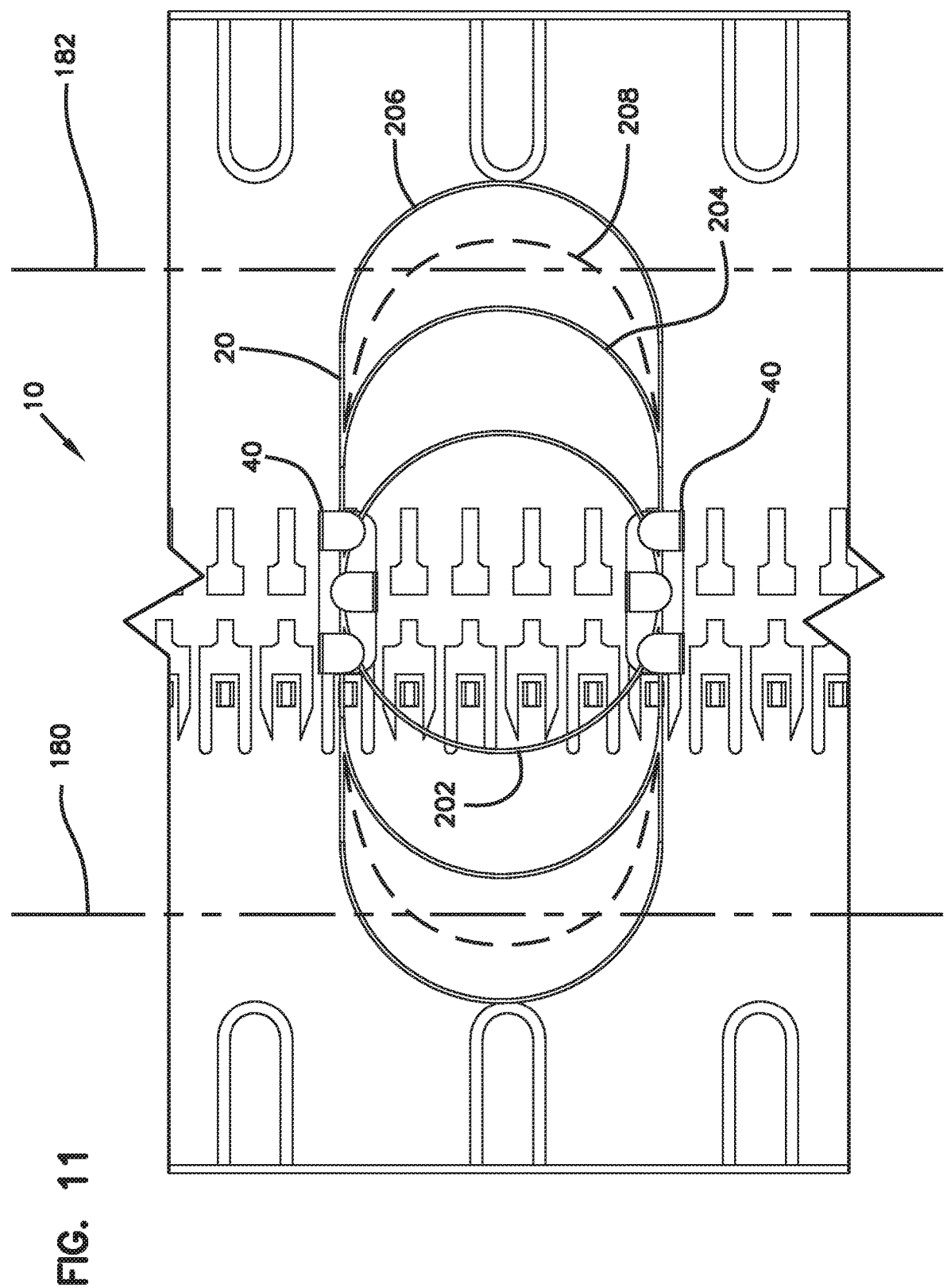
FIG. 11 illustrates the cable storage device of FIG. 9, showing one possible scenario that could arise if the cable loops are not allowed to have the shape of the largest cable loop.

FIG. 11 illustrates the cable storage device 10 of FIG. 9, showing one possible scenario that could arise if the cable loops, for example loop 206, 208 are not allowed to have the shape of the largest cable loop. Lines 180, 182 represent sidewalls of a tray that, if present for the cable 200, could create unmanaged black out lengths for any cable loops (such as loop 208) that extend outwardly past lines 180, 182. The reason is that loop 208 is not long enough to form two smaller loops 202. Therefore, an unmanaged loop 208 (having at least some unmanaged portions) could create problems for the technician or for keeping the fiber protected and organized. One solution could be to add more structures, but this is a less preferred manner of keeping the cable management devices simple and easy to access.

Figure 12:
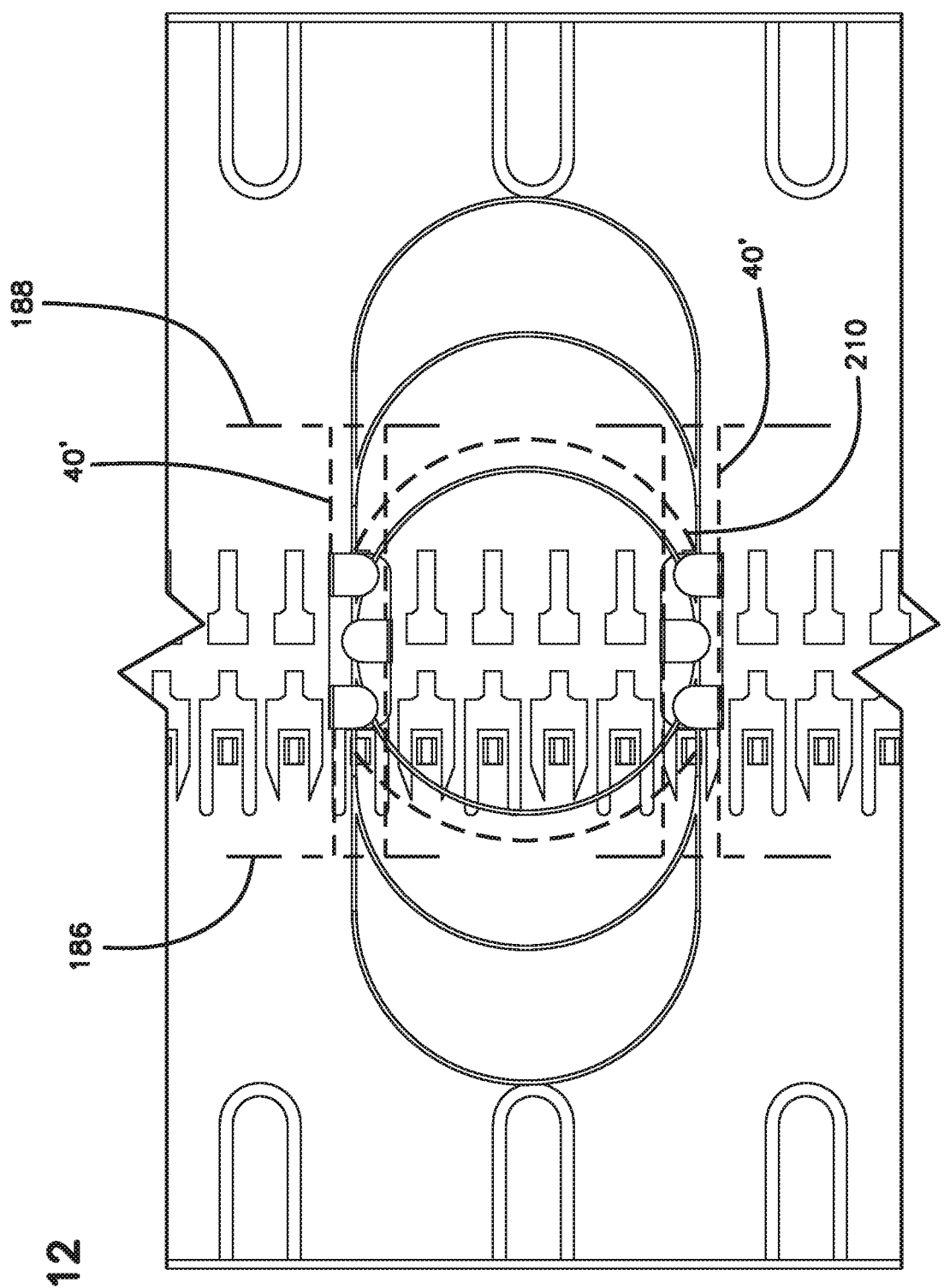
FIG. 12 illustrates the cable storage device of FIG. 9, showing one possible scenario that could arise if only linear segments are created by the cable management devices.

FIG. 12 illustrates the cable storage device 10 of FIG. 9, showing one possible scenario that could arise if only linear segments are created by the cable management devices. The longer the lengths, the more fiber storage could be limited. Lines 186, 188 represent the minimum linear cable routing paths of a hypothetical cable management device 40' of a tray that, if present for the cable 200, could create unmanaged black out lengths for any cable loops (such as loop 210) that must extend linearly between lines 186, 188. The reason is that loop 210 is not long enough to form a full loop while also extending past lines 186, 188. Therefore, an unmanaged loop 210 (having at least some unmanaged portions) could create problems for the technician or for keeping the fiber protected and organized. One solution could be to add more structures, but this is a less preferred manner of keeping the cable management devices simple and easy to access.

Figure 13:
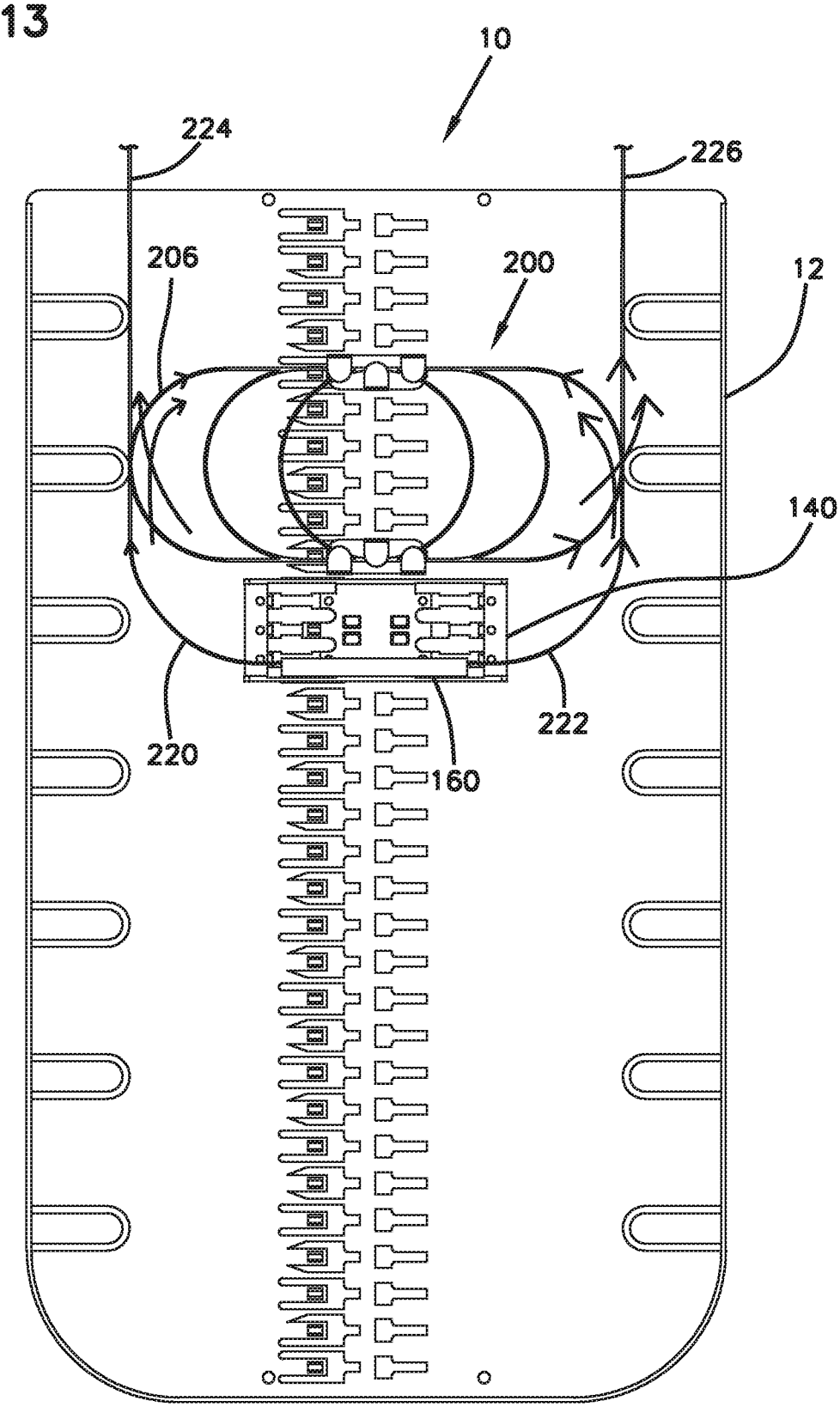
FIG. 13 shows the cable storage device of FIG. 1, including the addition of a splice holder which can be utilized with the two cable management devices.

As shown in FIG. 13, a tray 12 is shown with a fiber optic splice holder module 140 mounted to tray 12. The cable management devices 40 can be positioned as desired on tray 12 for managing fiber optic cables extending to and from the splices of the splice holders 140. Cable management devices 40 have generally planar exterior walls. An inner trough area is constructed to retain one or more fibers passing through the interior passage. Similarly, splice holders 140 have generally planar vertical walls to allow for side by side placement with other splice holder modules 140, other modules, or cable management devices 40 as in FIG. 13.

As also shown in FIG. 13, tray 12 is shown with a fiber optic splice 160 in fiber optic splice holder module 140 mounted to tray 12. Cable segments 220, 222 extend from cable loop 206 to be spliced at splice 160. Cable segments 224, 226 extend from loop 206 to leave tray 12. For example, cable segment 224 can be a fiber feeder cable and cable segment 226 can be a fiber drop cable, both extending to and from a closure structure protecting tray 12 in the interior of the closure.

Other telecommunications components can be mounted to tray 12 including splitter modules. The splitter modules can be mounted instead of splice holder modules 140 or in combination with splice holder modules 140.

Figure 14:
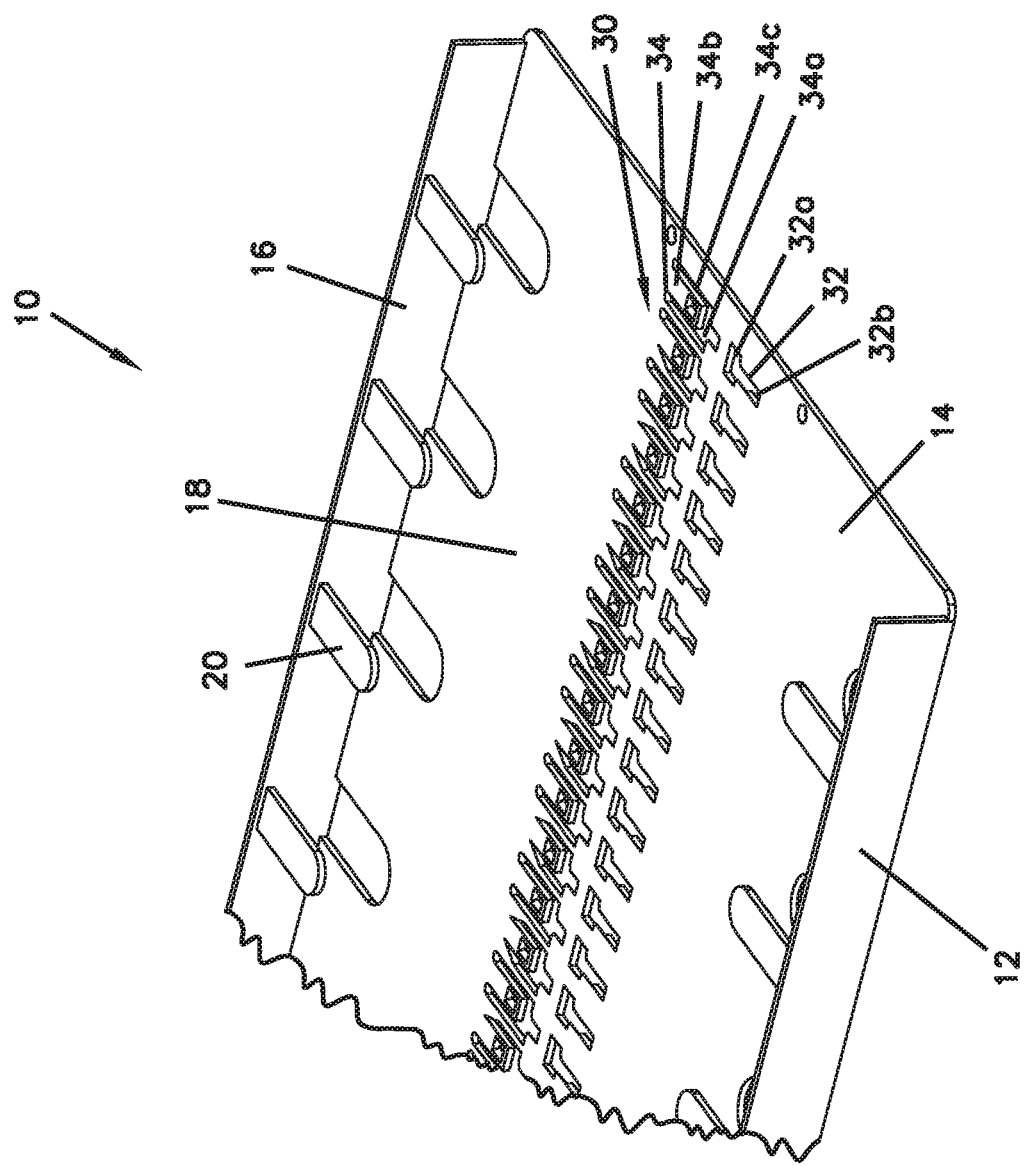
FIG. 14 shows the cable storage device of FIG. 1, and attachment arrangements for attaching cable management devices and components to the tray base.

The trays 12 and devices 40 and modules 140 are provided with compatible attachment features 30, 110 that allow for the devices/modules to be mounted to the trays. In one aspect, each attachment arrangement 30 of the tray 12 includes a pair of connection points 32, 34. (See FIG. 14.) The first connection point 32 is configured as a t-shaped opening in the base 14 with a first open portion 32a and a second open portion 32b. The second connection point 34, arranged oppositely from the first connection point 32, is configured with a first opening 34a into which a cantilevered tab 34b extends such that open side slots 34c exist on each side of the cantilevered tab 34b. Similarly constructed attachment arrangements for use with interconnecting telecommunications components are shown and described in Patent Cooperation Treaty (PCT) Application Serial Number PCT/US2019/17904, filed on Feb. 13, 2019, the entirety of which is incorporated by reference herein; Patent Cooperation Treaty (PCT) Application Serial Number PCT/US2019/028245, filed on Apr. 19, 2019, the entirety of which is incorporated by reference herein; and U.S. Provisional Patent Application Ser. No. 62/824,824, filed on Mar. 27, 2019, the entirety of which is incorporated by reference herein.

The attachment arrangement 110 of the cable management device 40 is configured with an attachment feature 112, including a pair of oppositely arranged interlock structures 114 and a pair of ramp structures 116. Accordingly, the base 42 can be attached to a pair of attachment arrangements 30 of the tray 12. It is also noted that the pairs of interlock and ramped structures 114, 116 are symmetrically arranged such that the cable management device 40 is symmetrical about a longitudinal axis. With such a configuration, the cable management device 40 can be easily mounted to the tray 12 in two orientations.

As shown, each of the ramp structures 116 includes a ramped surface 116a and a stop surface 116b. As shown, each of the interlock structures 114 includes a pair of angled or sloped surfaces 114a that form a dovetail shape, thereby enabling the interlock structures 114 to form a tight connection against the tray 12. As configured, the attachment arrangement 110 can be connected to the attachment arrangement 30 by aligning the main body bottom side 102 with the base 14 such that the interlock structures 114 and ramp structures 116 drop into the openings 32a, 32b of the connection point 32 and the opening 34a of the connection point 34. From this position, the base 42 can be displaced laterally in a direction towards the cantilevered tab 34b until the tab snaps over the ramped surface 116a and abuts the stop surface 116b. In this position, the attachment arrangements 110, 42 are fully interconnected. The U.S. 62/824,824, PCT/US2019/17904, and PCT/US2019/028245 applications describe a generally similar connection arrangement between two components. To detach the cable management device 40 from the tray 12, the cantilevered tabs 34b can be disengaged by depressing them away from the base 42 and tray 12.

The example attachment device and method described above is provided by way of illustration only and should not be construed to limit the scope of the present disclosure.

Those skilled in the art will readily recognize various modifications and changes that may be made with respect to the examples and applications illustrated and described herein without departing from the true spirit and scope of the present disclosure.

What is claimed is:

1. A telecommunications assembly, comprising:
a tray, the tray having a base and a sidewall;
two cable management devices provided on the base of the tray for containing one or more fiber loops;
wherein only two cable management devices are provided on the tray facing one another in an area for containing the one or more fiber loops;
wherein the two cable management devices allow for storage of fiber loops having a length defined by a cable in a full loop having the radius of the minimum bend radius of the cable up to and including a length twice as long as the full loop having the radius of the minimum bend radius of the cable;
wherein the two cable management devices allow for storage of fiber loops wherein no linear segments are defined by the full loop having the radius of the minimum bend radius of the cable; and wherein linear segments are provided in loops greater in length than a full loop having the radius of the minimum bend radius of the cable;
wherein the cable management devices are each provided with a base, and three uprights;
wherein two uprights are on one side of the base of each cable management device, and one upright is on an opposite side of the base of each cable management device;
wherein when the cable management devices are mounted on the tray for containing one or more fiber loops, the cable management devices are mounted facing one another with the sides of the base with the one upright facing each other;
wherein overhanging tabs on the ends of the uprights are provided for fiber retainment;
a closure including a tray system including a plurality of the trays, and at least one component module including one of a fusion splice holder module, a WDM, or a splitter on at least one of the trays;
wherein the trays, the cable management devices, and the at least one component module are provided with compatible attachment features that allow for the cable management devices and the at least one component module to be mounted to the trays;
a plurality of fiber loops held by the two cable management devices, wherein each fiber loop has a length no more than two times the minimum bend radius.

2. The telecommunications assembly of claim 1, wherein each cable management device includes a dovetail shaped interlock structure for connecting to the base of the tray.

3. A telecommunications assembly, comprising:
a tray;
two cable management devices provided on the tray for containing one or more fiber loops;
wherein two cable management devices are provided on the tray facing one another;
wherein the two cable management devices allow for storage of fiber loops having a length defined by a cable in a full loop having the radius of the minimum bend radius of the cable up to and including a length twice as long as the full loop having the radius of the minimum bend radius of the cable;
wherein the two cable management devices allow for storage of fiber loops wherein no linear segments are defined by the full loop having the radius of the minimum bend radius of the cable; and wherein linear segments are provided in loops greater in length than a full loop having the radius of the minimum bend radius of the cable;
wherein:
$Pn$=Perimeter of Path n;
$Ln$=Tangent Length of Path n;
$Rn$=Minimum Bend Radius of Path n;
$P3=2*P1$ (continuous range of slack storage from P1 to P3);
$P1=2*Pi*R1$;
$P3=2*(2*Pi*R1)=2*L3+(2*Pi*R3)$;
$R3=R1$;
$L3=P1*R1$;
If: $L3=Pi*R1$,
Then: Pn can be any length>P1;
If: Pn is between P1 and two times P3;
Then: maximum of two coils are required;
If: Pn is between P1 and three times P3;
Then: Maximum of three coils are required;
If: Pn is between P1 and N times P3;
Then: Maximum of N coils are required;
wherein each cable management device includes a dovetail shaped interlock structure for connecting to the tray, the tray having a plurality of attachment arrangements for connecting to the dovetail shaped interlock structure of each of the cable management devices;
a plurality of fiber loops held by the two cable management devices, wherein each fiber loop has a length no more than two times the minimum bend radius.

* * * * *